(12) United States Patent
Chevalier et al.

(10) Patent No.: US 6,275,800 B1
(45) Date of Patent: Aug. 14, 2001

(54) VOICE RECOGNITION SYSTEM AND METHOD

(75) Inventors: David Erik Chevalier, Mukwonago, WI (US); Henry L. Kazecki, Arlington Heights, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/256,279

(22) Filed: Feb. 23, 1999

(51) Int. Cl.$^7$ ................................................ G10L 11/02
(52) U.S. Cl. ........................ 704/246; 704/233; 704/226
(58) Field of Search .................................... 704/233, 246, 704/248, 256, 226, 238, 239

(56) References Cited

U.S. PATENT DOCUMENTS

| | | | |
|---|---|---|---|
| 5,201,004 | * | 4/1993 | Fujiwara et al. ..................... 704/233 |
| 5,386,492 | * | 1/1995 | Wilson et al. ........................ 704/252 |
| 5,416,887 | * | 5/1995 | Shimada ............................... 704/233 |
| 5,749,068 | * | 5/1998 | Suzuki .................................. 704/233 |
| 5,778,342 | * | 7/1998 | Erell et al. ........................... 704/256 |
| 5,793,863 | * | 8/1998 | Hashimoto ........................... 379/387 |
| 5,832,430 | * | 11/1998 | Lleida et al. ......................... 704/256 |
| 5,864,804 | * | 1/1999 | Kalveram ............................. 704/233 |
| 5,960,397 | * | 9/1999 | Rahim .................................. 704/244 |
| 5,970,446 | * | 10/1999 | Goldberg et al. .................... 704/233 |
| 6,067,513 | * | 5/2000 | Ishimitsu ............................. 704/233 |

\* cited by examiner

*Primary Examiner*—Richemond Dorvil
*Assistant Examiner*—Daniel Abebe
(74) *Attorney, Agent, or Firm*—Randall S. Vaas; Michael C. Soldner (57) ABSTRACT

A voice recognition system (204, 206, 207, 208) generates a variable rejection strictness as a function of at least one background noise level measured during training and noise signal measurements made during an input utterance made during recognition mode of operation. A word entrance penalty is assigned as a function of the variable rejection strictness.

10 Claims, 5 Drawing Sheets

VOICE RECOGNITION SYSTEM AND METHOD

FIELD OF THE INVENTION

The present invention pertains to voice recognition.

BACKGROUND OF THE INVENTION

Speaker dependent speech recognition systems use a feature extraction algorithm to perform signal processing on a frame of the input speech and output feature vectors representing each frame. This processing takes place at the frame rate. The frame rate is generally between 10 and 30 ms, and will be exemplified herein as 20 ms in duration. A large number of different features are known for use in voice recognition systems.

Generally speaking, a training algorithm uses the features extracted from the sampled speech of one or more utterances of a word or phrase to generate parameters for a model of that word or phrase. This model is then stored in a model storage memory. These models are later used during speech recognition. The recognition system compares the features of an unknown utterance with stored model parameters to determine the best match. The best matching model is then output from the recognition system as the result.

It is known to use a Hidden Markov Model (HMM) based recognition system for this process. HMM recognition systems allocate frames of the utterance to states of the HMM. The frame-to-state allocation that produces the largest probability, or score, is selected as the best match.

Many voice recognition systems do not distinguish between valid and invalid utterances. Rather, these systems choose one of the stored models which is the closest match. Some systems use an Out-of-Vocabulary rejection algorithm which seeks to detect and reject invalid utterances. This is a difficult problem in small vocabulary, speaker dependent speech recognition systems due to the dynamic size and unknown composition of the vocabulary. These algorithms degrade under noisy conditions, such that the number of false rejections under noisy conditions increases.

In practice, out-of-vocabulary rejection algorithms must balance performance as measured by correct rejections of invalid utterances and false rejections of valid utterances. The false rejection rate can play a critical role in customer satisfaction, as frequent false rejections, like incorrect matches, will cause frustration. Thus, out-of-vocabulary rejection is a balance of meeting user expectations for recognition.

Accordingly it is known to calculate a rejection threshold based upon the noise level. For example, it is known to measure the noise level prior to the detection of the first speech frame. A threshold is calculated from the measurement. An input is rejected if the difference between the word reference pattern and the input speech pattern is greater than the rejection threshold. Such a system is thus dependent upon an arbitrary noise input level. Such measurement can not be relied upon to produce a meaningful rejection decision.

Accordingly, there is a need for an improved method of providing a basis for rejecting utterances in a voice recognition system.

DETAILED DESCRIPTION OF THE DRAWINGS

The present invention has a variable rejection strictness depending upon the background noise levels during training and recognition. During training, noise features are generated from the training utterances. An incremental noise reference mean is updated from the noise features. The statistics are stored in memory to make them available to the recognition algorithm. Noise statistics are not updated when training in a handsfree mode because of the higher levels of background noise. If there are no noise statistics available, the recognition algorithm defaults to the minimum strictness.

During recognition, the input noise energy feature is compared to the reference noise statistics and a noise ratio is computed. The strictness of the out of vocabulary rejection algorithm is then selected based upon the noise ratio. The present invention helps to prevent false rejection of valid utterances in the presence of noise.

The strictness parameter is a word entrance penalty in the two level alignment algorithm recognition search. The confidence measurement of the best path is implemented as a zero mean one state garbage model in parallel with the voice tag models.

Figure 1:
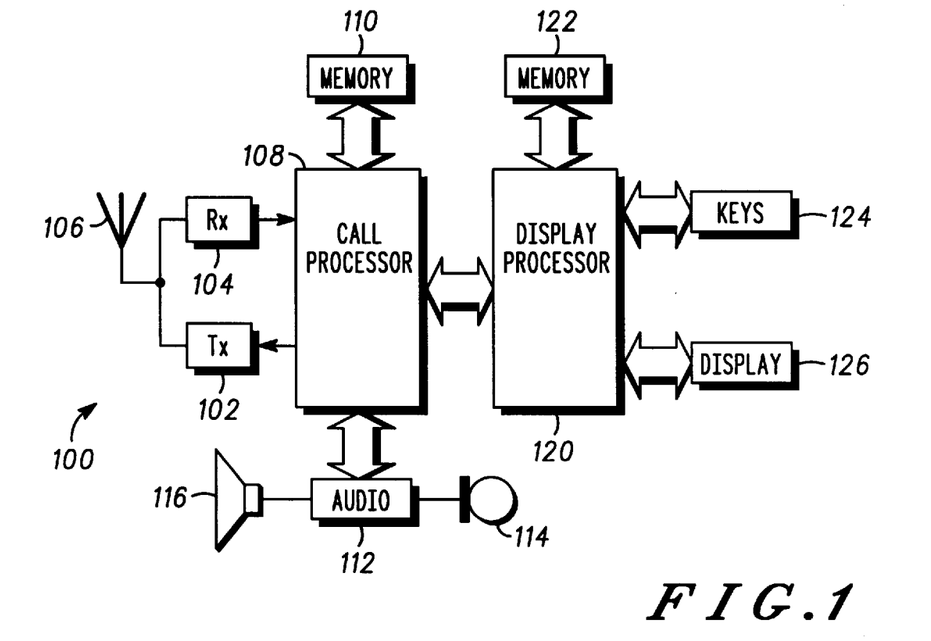
FIG. 1 is a circuit schematic in block diagram form illustrating a wireless communication device.

A device 100, in which the invention can be advantageously employed is disclosed in FIG. 1. The device 100 is described to be a portable radiotelephone herein for illustrative purposes, but could be a computer, a personal digital assistant, or any other device that can advantageously employ voice recognition, and in particular a device which can take advantage of a memory efficient voice recognition system. The illustrated radiotelephone includes a transmitter 102 and a receiver 104 coupled to an antenna 106. The transmitter 102 and receiver 104 are coupled to a call processor 108, which performs call processing functions. The call processor 108 can be implemented using a digital signal processor (DSP), a microprocessor, a microcontroller, a programmable logic unit, a combination of two or more of the above, or any other suitable digital circuitry.

The call processor 108 is coupled to a memory 110. Memory 110 contains RAM, electronically erasable programmable read only memory (EEPROM), read only memory (ROM), flash ROM, or the like, or a combination of two or more of these memory types. The memory 110 supports operation of the call processor 108, including the voice recognition operation, and must include an electronically alterable memory to support the state transition path memory. The ROM can be provided to store the device operating programs.

An audio circuit 112 provides digitized signals from a microphone 114 to call processor 108. The audio circuit 112 drives speaker 116 responsive to digital signals from the call processor 108.

The call processor 108 is coupled to a display processor 120. The display processor is optional if additional processor support is desired for the device 100. In particular, the display processor 120 provides display control signals to the display 126 and receives inputs from keys 124. The display processor 120 can be implemented using a microprocessor, a microcontroller, a digital signal processor, a programmable logic unit, a combination thereof, or the like. A memory 122 is coupled to the display processor to support the digital logic therein. The memory 122 can be implemented using RAM, EEPROM, ROM, flash ROM, or the like, or a combination of two or more of these memory types.

Figure 2:
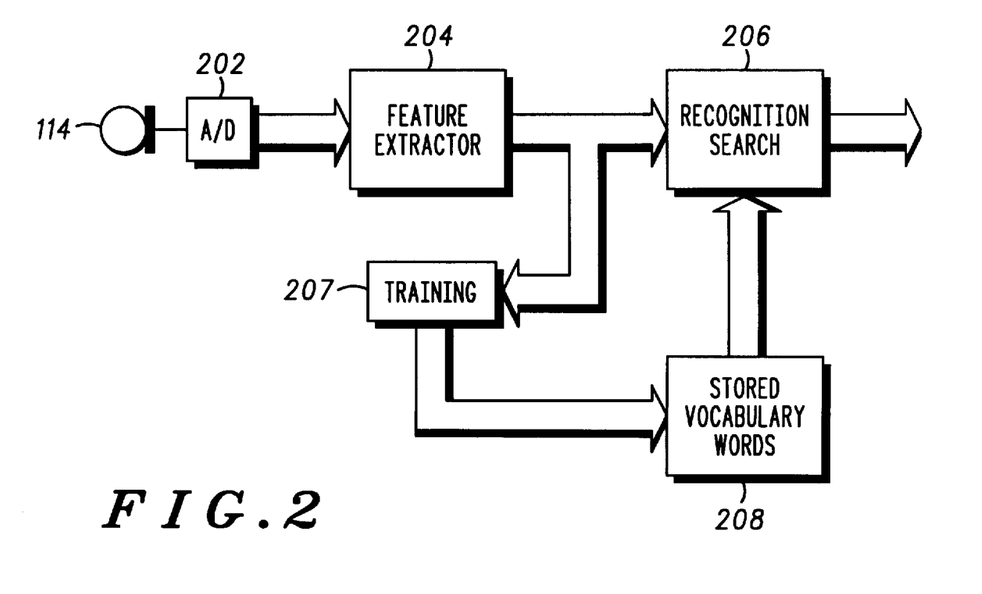
FIG. 2 is a circuit schematic in block diagram form illustrating a voice recognition system in the device according to FIG. 1.

With reference to FIG. 2, the audio signals received by microphone 114 are converted to digital signals in an analog-to-digital converter 202 of audio circuit 112. Those skilled in the art will recognize that the audio circuit 112 provides additional signal processing, such as filtering, which are not described herein for brevity. The call processor, 108, performs feature extraction 204 on the processed digital signal representation of the analog signal output by microphone 114 and produces a set of feature vectors representative of the user utterance. A feature vector is produced for each short time analysis window. The short time analysis window is a frame, which in the example illustrated herein is 20 ms. Thus there is one feature vector per frame. The processor 108 uses the features for speech recognition 206 or training 207.

In training, the feature vectors of the utterance are used to create templates in the form of HMMs, which are stored in memory 208. In speech recognition, the feature vectors representing the input utterance are compared to the templates of stored vocabulary words in memory 208 to determine what the user said. The system may output the best match, a set of the best matches, or optionally, no match. Memory 208, is preferably a non-volatile memory portion of memory 110 (FIG. 1), and may for example be an EEPROM or flash ROM. As used herein, "words" can be more than one word, such as "John Doe," or a single word such as "call".

The feature extractor 204, generally performs signal processing on a frame of the input speech, and outputs feature vectors representing each frame at the frame rate. The frame rate is generally between 10 and 30 ms, and may for example be 20 ms in duration. Trainer 207 uses the features extracted from the sampled speech of one or more utterances of a word or phrase to generate parameters for a model of that word or phrase. This model is then stored in a model storage non-volatile memory 208. The model size is directly dependent upon the feature vector length, such that a longer feature vector length requires a larger memory.

The models stored in memory 208 are then used during recognition 206. The recognition system performs a comparison between the features of an unknown utterance and stored model parameters to determine the best match. The best matching model is then output from the recognition system as the result.

Figure 3:
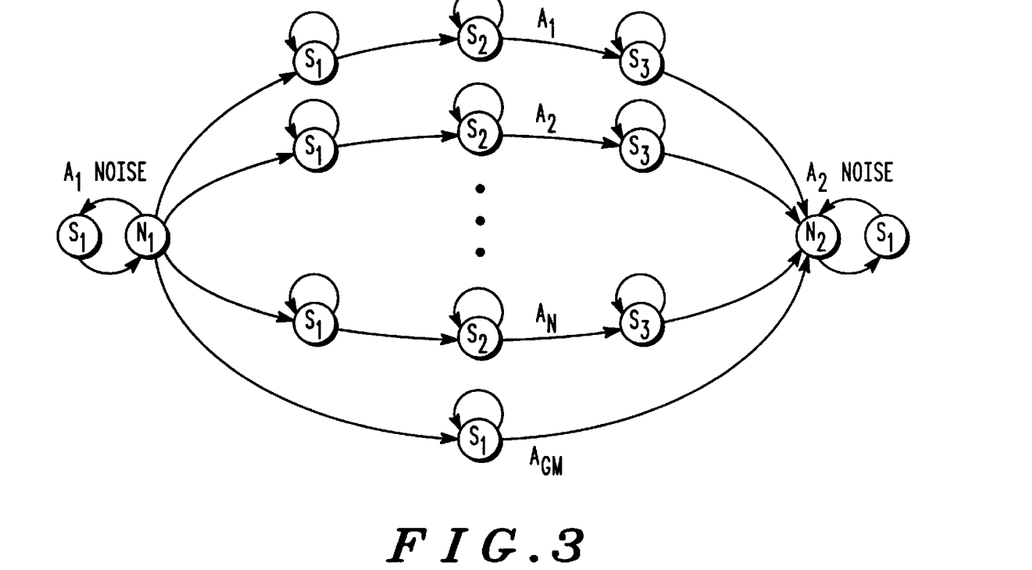
FIG. 3 is an illustration of a grammar network with two nodes.

With reference now to FIG. 3, a grammar network representing speech recognition is illustrated. The Node $N_1$ and $N_2$ are connected by HMM models represented by arcs $A_1$ through $A_N$ plus a garbage model arc $A_{GM}$. Arcs $A_1$ through $A_N$ represent all of the individual HMM models that have been trained in the voice recognition systems and stored in the memory 208. The garbage model arc represents a single state garbage model reference.

The node $N_1$ includes a single state noise model $A_1^{noise}$. The node $N_2$ similarly contains a single state noise model $A_2^{noise}$. The recognition system employs a recognition algorithm to select one of the arcs $A_1$ through $A_N$, and $A_{GM}$, as the best match, or optionally identifies no match (i.e., if no speech is detected). If $A_{GM}$ is the best arc, the input is rejected as invalid.

Figure 4:
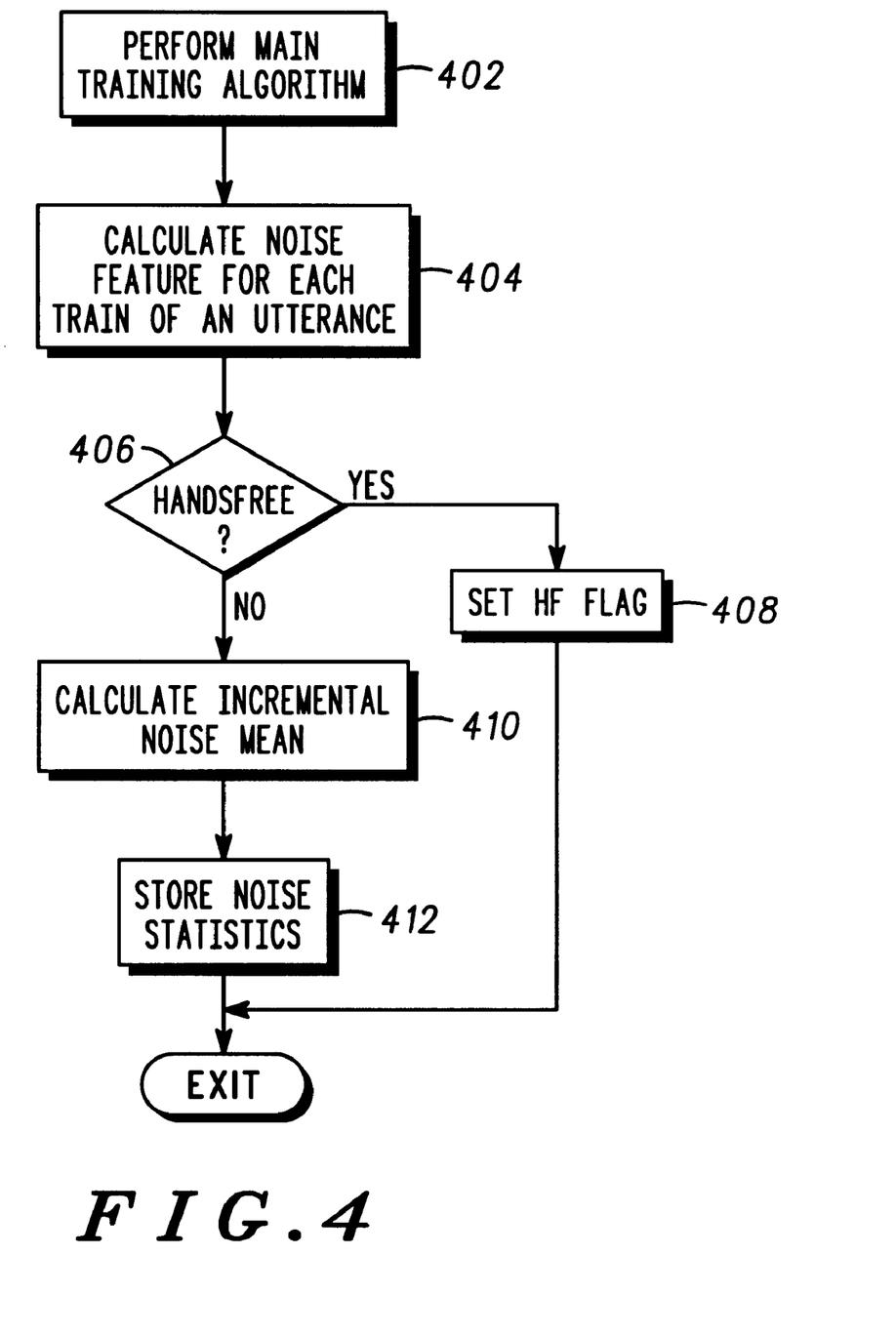
FIG. 4 is a flow chart illustrating training.

With reference now to FIG. 4, the training process will be described. Initially, a main training 207 is performed to derive each utterance, or state model, $A_1$ through $A_N$, to be stored in the memory 208, as indicated in step 402. A number of different methods are known for creating the HMM models. In the illustration of FIG. 4, each arc is a left to right, HMN model with no state skips, such that only self loops and single steps transitions are allowed. A brief description of the derivation of such a model is described hereinbelow. Those skilled in the art will recognize that the arcs can be of other known models, and by other known methods.

Initially, features are extracted, in feature extractor 204. It is envisioned that the feature extractor will generate cepstral and delta cepstral coefficients for each frame of an utterance. Those skilled in the art will recognize that there are many ways of calculating cepstral features and for estimating their derivative, and any suitable technique for deriving these coefficients can be used. Frames $F_1$ through $F_N$(FIG. 5) are produced during the window, each frame comprising features. Some of the frames represent noise, from which noise energy features are produced by the feature extractor. Other frames represent a portion of the speech signal.

Figure 5:
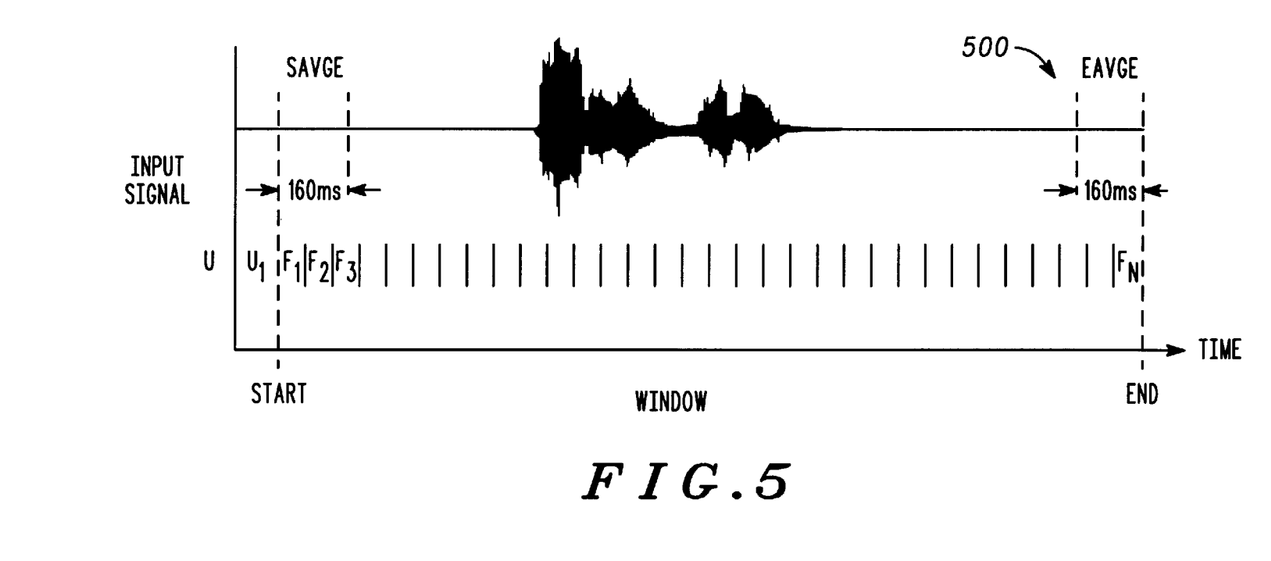
FIG. 5 illustrates a window and frames corresponding thereto.

Returning to FIG. 4, in step 404, the processor 108 during training 207, calculates a noise feature for each arc model as indicated in step 604. The noise measurement is made from the feature vectors produced during the start and end of the capture window. In particular, it is desirable to use the average of the feature vectors measured during a start period and an end period of the utterance. For example the first 160 ms, Savge, and the last 160 ms, Eavge, of the capture window can be used. The capture window is shown in FIG. 5, including the start period and the end period during which noise feature vectors are stored. The capture window may be 2 seconds long, for example, representing the maximum duration of a word. This capture window can be fixed or variable length, depending on the expected length of the input utterances and the implementation's memory constraints.

The processor 108, having derived the noise feature in step 404, determines whether the device is in hands-free mode in step 406. The device may include a state flag that indicated that the device is in hands-free mode which is activated by the user through a keypad menu or it may include a mechanical connector that actuates a switch when the device 100 is connected to a hands-free kit.

If the device is not in a hands-free mode, the processor calculates during training (which is done independently for each utterance), a noise feature Xnz which is the minimum of Savge and Eavge (i.e., min(Savg,Eavg)), as indicated in step 410. For each frame of input speech, an energy value can be computed from its samples. Savge and Eavge are averages of these energy values from the indicated frames. The minimum is used for each of the training utterances to update a running noise mean. This noise mean is updated iteratively using the following equation:

$$Xref(k)=((k-2)*Xref(k-2)+(Xnz1+Xnz2))/k$$

where Xref(k) is the reference value for the k-th noise feature, Xnz1 indicates the noise feature found from the minimum of Savge and Eavge of the first training utterance and Xnz2 is the noise feature from the minimum of Savge and Eavge of the second training utterance.

The updated noise mean and the number of training utterances used for noise mean updates are recorded in memory 110 as indicated in step 412.

If it was determined in step 406 that the device was in hands-free mode, as indicated in step 408, a hands-free flag HF is set as indicated in step 408. The flag HF is set indicating the presence of hands-free word models instead of updating the noise model, if training is in hands-free mode.

It is assumed that the training environment will be relatively quiet. This can be enforced through a signal quality check which requires that all training utterances have at least an 18 dB signal to noise ratio. Checks can also be employed to insure that the user does not speak during Savge and Eavge measurement time.

Figure 6:
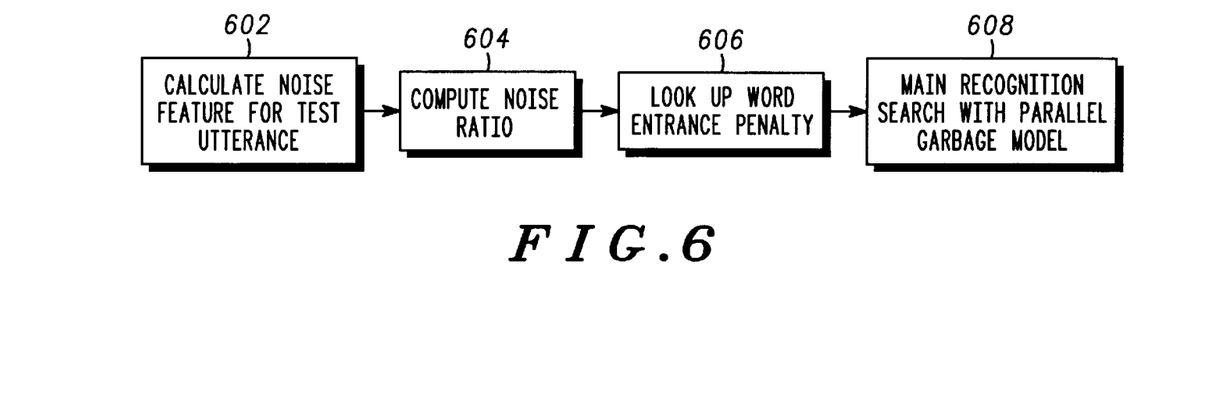
FIG. 6 is a high level flow chart illustrating recognition.

The general operation of recognition 206 by processor 108 is described generally with respect to FIG. 6. Initially, the noise feature is calculated for the test utterance, which is the input utterance that the system is trying to identify, as indicated in step 602. In the recognition mode, background noise measurement is made from the same initial 160 ms Savge and final 160 ms Eavge of the utterance window. The noise measurement during recognition is Xrecog and is equal to the average of Savge and Eavge. This value is compared to the reference noise value as calculated in the training mode. A comparison is used to find the ratio of the recognition background noise estimate to the training background noise estimate. Those skilled in the art will recognize that that other relative comparison of these values can be used.

Figure 8:
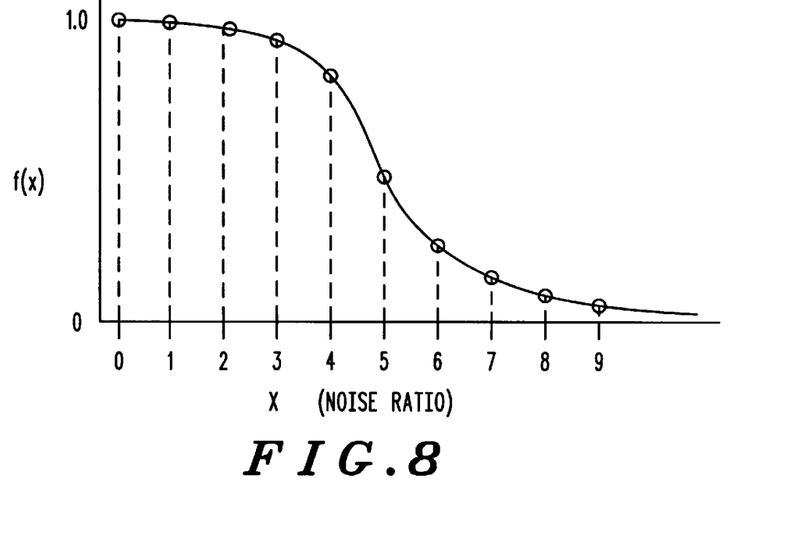
FIG. 8 illustrates the penalty function.

The processor 108 next calculates the word penalty in step 606. The ratio is used to calculate a word entrance penalty. The word entrance penalty controls the strictness of the Out-of-Vocabulary rejection. In general, higher noise environments have a lower strictness value. The word entrance penalty is calculated using a look up table with the noise index ratio being the address for the memory table and the penalty being the output. An advantageous ten penalty distribution as illustrated in FIG. 8 can be used, wherein significantly noisier environments in the recognition mode (ratios 6–9) have a substantially smaller penalty than ratios representing recognition modes closer to the training mode noise reference (ratios 0–4). For example, the curve can be derived as follows:

$$x = X\text{ref}(k)/X\text{recog}$$

$$f(x) = 1/(1+2^{1.5(x-5)}).$$

Out of range index ratios will default to the minimum word entrance penalty, which is zero. The actual penalty applied may for example be $-220 * f(x)$, although the actual scalar can be of any value that results in a penalty have a desirable proportion to the scores it is combined with. The use of the non-linear relationship provides a significant improvement of in vocabulary and out of vocabulary recognition by providing a large penalty when noise conditions are good and a small penalty when noise conditions are bad. Those skilled in the art will recognize that the calculation of the word entrance penalty may be made directly, rather than through the use of a look-up table.

The recognition continues with its main search and parallel garbage models, as indicated in step 608. The goal of the recognition system is to find the most likely path from node $N_1$ to Node $N_2$ in FIG. 3. The nodes $N_1$ and $N_2$ are coupled by paths $A_1$–$A_N$ representing the Hidden Markov Models for the N word vocabulary, optionally including a garbage model $A_{GM}$. Additionally $A_1^{noise}$ and $A_2^{noise}$ represent the noise models and are associated with nodes $N_1$ and $N_2$. The garbage model attempts to capture any non-vocabulary sounds or words in the input utterance. It is a one state zero-valued model used only by the Out-of-Vocabulary rejection algorithm. To prevent it from modeling noise better than the noise model, a penalty is applied to garbage model probability scores for frames classified as noise.

The search through the grammar network, as illustrated in FIG. 3, is done by a two level alignment algorithm, such as a Viterbi algorithm. The lowest level of this search finds the best alignment and path score between the frames of the input utterance and the states of a given arc. An example of techniques used to apply frames of an utterance to states of an individual model are disclosed in copending patent application Docket Number CS10103, entitled METHOD OF TRACEBACK MATRIX STORAGE IN SPEECH RECOGNITION SYSTEM, filed in the name of Jeffrey Arthur Meunier et al. on the same date as this application, and copending patent application filed on even date herewith, docket number CS10104, entitled METHOD OF SELECTIVELY ASSIGNING A PENALTY TO A PROBABILITY ASSOCIATED WITH A VOICE RECOGNITION SYSTEM, filed in the name of Daniel Poppert, the disclosures of which is incorporated herein by reference thereto. The lower level alignment algorithm generates a score for the best path of the input utterance through the given HMM arc.

In addition to the lower level alignment algorithm wherein the scores of each arc, or HMM, are tracked via cumulative probabilities $c_i^n(m)$, which is the cumulative probability of state i of arc $A_n$ at frame m), nodes $N_1$ and $N_2$ must also track their own cumulative probabilities. The node cumulative probability $C_J(m)$, is the cumulative probability of Node $N_j$ at frame m. This probability is calculated much like the cumulative probability of each HMM in that it keeps the highest score to the node. The cumulative probability can be calculated as follows:

$$C_J(m+1) = \text{Max}_{n \in A_j}\{C^n{}_{In}(m) + Po_{In}(d_{In})\}$$

where Aj is the set of arcs $\{A_1, A_2, \ldots, A_N\}$ which terminate at node j, In is the number of states in arc n, $d_{In}$ is the duration of the last state of arc n, and $Po_1(d_{In})$) is the out of state transition penalty for the last state of arc n. The cumulative probability is the maximum over all arcs that terminate on node Nj of the sum of the last state's cumulative probability $C_{In}{}^n(m)$ with its out of state probability $Po_{In}(d_{In})$.

While tracking the cumulative probabilities for the nodes, the calculation of the cumulative probability for the initial state of each arc, $c_1{}^n(m)$ must be modified to allow for transitions into its initial state from a node Nj. There is a one time transition penalty assigned to the transition from the node Nj to the initial state of arc An, called a word entrance penalty. It does not apply to the noise model or to the garbage model, so it acts as a strictness control on the Out of Vocabulary rejection when enabled. The cumulative probability can be seen to be $$C_i^n(m+1) = o_i^n(f_m) + \max(C_j(m)+W(n), C_1^n(m)+Ps_1(d_1))$$

$$\text{where } W(n) = \begin{cases} g(x) & \text{if } n \in \{A_1, A_2, , A_3\} \\ 0 & \text{if } n \in \{A_1^{noise}, A_2^{noise}, A_{GM}\} \end{cases}$$

where W(n) is the word entry penalty, $A_{GM}$ is the garbage arc, $A_1^{noise}$ is the noise arc for node 1, $o_i^n(f_m)$ is the observation probability of the feature vector fm in state i of arc n, and $Ps_1(d_1)$ is the same state transition penalty of state 1 of arc n. This equation keeps the maximum of either the same state transition to the transition from the originating node and adds to the observation probability. The information retained at the end of the recognition process is the arc that was traversed to get to node $N_2$. This is done by propagation path information along with the cumulative probabilities $C_i^n(m)$ and $C_j^n(m)$.

For valid utterances, the word model's best path through the alignment algorithm must produce a better score than the garbage model by a value greater than the word entrance penalty, or the valid utterance will be falsely rejected. For invalid utterances, the garbage model must be greater than the path through each of the eligible word models such that the utterance is correctly rejected.

The recognition algorithm uses the entire window of feature vectors collected, which may for example typically be 2 seconds worth of data. Additionally it uses a speech/noise classification bit for each frame to update the one state noise model used in $A_1^{noise}$ and $A_2^{noise}$ of FIG. 3.

Figure 7:
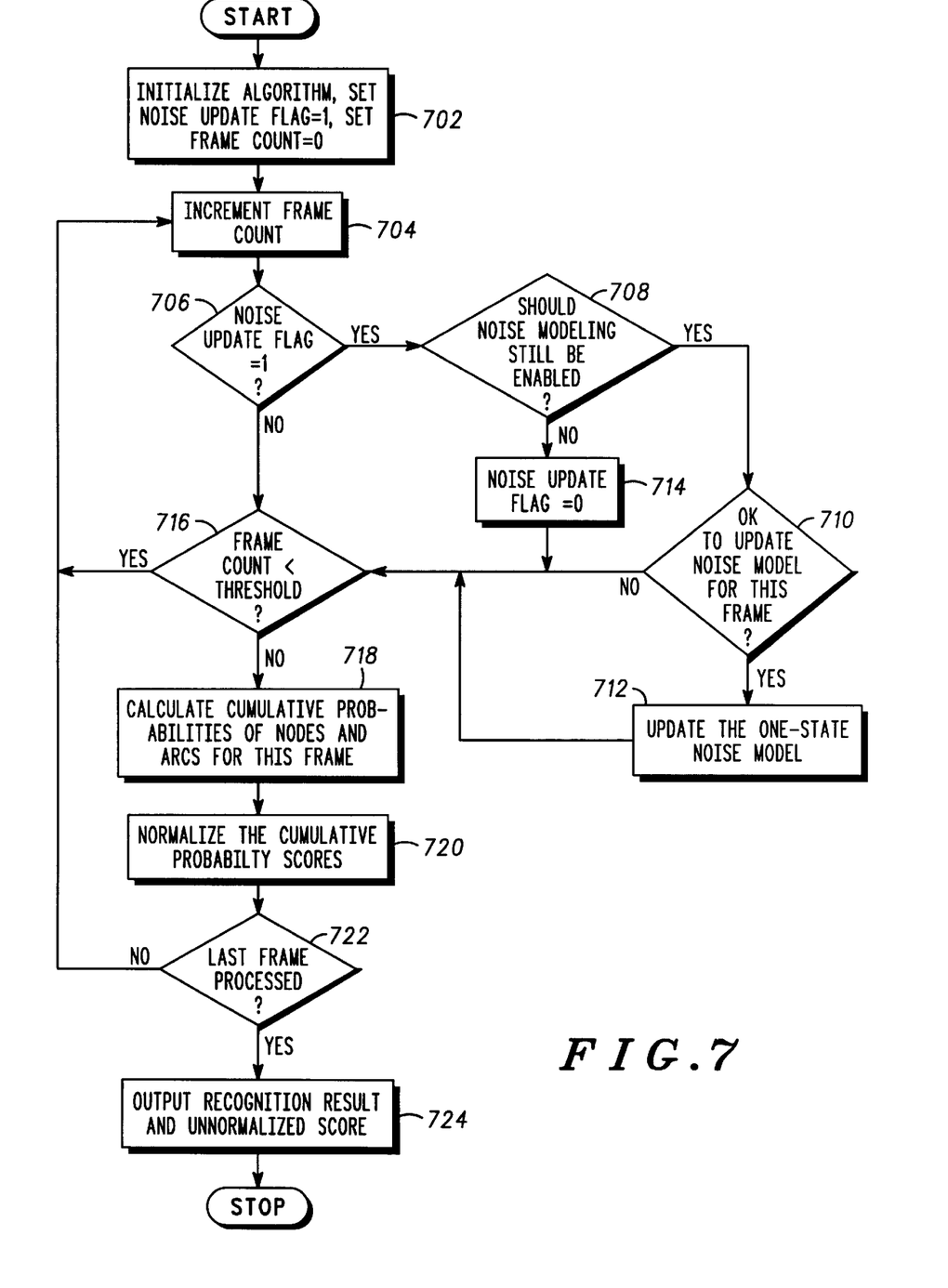
FIG. 7 is a flow chart illustrating training during recognition.

In the recognition mode, the processor 108 initializes recognition by setting the noise update flag to 1 and the frame count to zero, as indicated in step 702. The frame count is incremented in step 704. The processor then determines whether the noise flag is set in step 706. If not, the processor proceeds to decision 716. If the flag is set, the processor 108 determines whether the noise model should still enabled in step 708. If not, the noise update flag is set to 0 in step 714. Noise modeling is turned off after a certain number of updates are made If noise updating should still be performed, the processor determines whether to update the noise model in step 710. If the processor is to update the noise model for the frame, the model is update in step 712. The noise model $A_1^{noise}$ and $A_2^{noise}$ are computed dynamically by the system through the use of the speech/noise classification bits sent in by the feature extraction algorithm. The details of the decision of whether to update the noise model for the current frame is made by looking at the speech classification made by the feature extraction algorithms. Once a predetermined number of consecutive speech frames are seen for the utterance, no more updates are made. For example, the limit may be 3 frames. The noise model will only be updated for a particular frame if that frame's speech to noise classification indicates that it is a noise frame.

The processor then determines whether the frame count is less than a threshold number of frames in step 716. Probability estimation will not begin until a certain number of frames have been processed. This is to allow the noise model to become somewhat accurate before probabilities based on the noise model are calculated. If the threshold number of frames have not been received, the processor returns to step 704 wherein the frame count is incremented by one.

If the frame count exceeds the threshold, the processor 108 calculates cumulative probabilities for the nodes and arcs for the frame in step 718. The probability scores are normalized in step 720. Normalization can be provided by subtracting the largest cumulative probability from all other cumulative probabilities. The cumulative normalization factor is also tracked so that the unnormalized score can be returned at the end of the recognition process.

The processor then determines if the last frame was processed in step 722. If not, the processor returns to step 704 and increments the frame count. Otherwise, the recognition result is output with the normalized score as indicated in step 724.

The noise model is a one state model. The vector mean of this state is $\mu_1^{noise}(m)$ which is a function of m because it is computed dynamically and is updated with a new feature vector $f_{m+1}$ at frame m+1 as follows:

$$\mu_1^{noise}(m) = ((M_{noise}(m) * \mu_1) + f_{m+1})/(M_{noise}(m)+1)$$

where $M_{noise}(m)$ is the number of noise frames that have been used in the computation of $\mu_1^{noise}(m)$, which can be different that the value of m since not all frames are used in the noise update. Additionally, the update equation is used only for the cepstral elements of the noise model. The delta-cepstral and the delta energy elements are fixed at zero.

Accordingly, it can be seen that an improved system is disclosed providing variable rejection strictness depending upon the background noise levels during training and recognition. The system helps to prevent association of invalid utterances with stored speech models and helps improve the accurate detection of valid utterances.

Although the invention has been described and illustrated in the above description and drawings, it is understood that this description is by way of example only and that numerous changes and modifications can be made by those skilled in the art without departing from the true spirit and scope of the invention. Although the present invention finds particular application in portable wireless devices such as cellular radiotelephones, the invention could be applied to any device employing speech recognition, including pagers, electronic organizers, computers, and telephony equipment. The invention should be limited only by the following claims.

What is claimed is:

1. A method of operating a voice recognition system, comprising the steps of:

calculating a noise reference feature, in a training mode, as a function of a training input utterance;

calculating an input noise value, in a recognition mode, as a function of an input utterance;

calculating a reject value as a ratio of the input noise value and the noise reference feature; and determining a best match and selecting the determined best match in response to the determined best match being greater than the reject value.

2. The method as defined in claim 1, further including the step of selectively updating the noise reference feature from the training input utterances.

3. The method as defined in claim 2, wherein noise statistics are not updated when training in a hands-free mode.

4. The method as defined in claim 2, further including the step of generating a signal to noise ratio, and wherein training is prohibited of the signal to noise ratio is below a predetermined level.

5. The method as defined in claim 1, further including the step of storing noise statistics during training with a model so that the noise statistics are available during the recognition mode of operation.

6. The method as defined in claim 1, wherein during the recognition mode, if no noise statistics are available for an utterance, a recognition algorithm defaults to a minimum strictness requirement when applying an alignment algorithm to that utterance.

7. The method as defined in claim 1, wherein a confidence measurement of a best path is implemented using a zero mean one state garbage model in parallel with voice tag models.

8. A method of operating a voice recognition system, comprising the steps of:

generating a variable rejection strictness as a function of at least one background noise level measured during training and noise signal measurements made during an input utterance made during recognition mode of operation; and deriving a word entrance penalty as a function of the variable rejection strictness, wherein during recognition, the input noise signal measurements are compared to the measured background noise level and a noise ratio is computed, and wherein the voice recognition system determines a best match and selects the determined best match using the word entrance penalty.

9. The method as defined in claim 8, wherein strictness of an out of vocabulary rejection algorithm is then selected based upon the noise ratio.

10. A radiotelephone comprising:

a microphone for inputting user utterances; and voice recognition system coupled to the microphone, the voice recognition system calculating a noise reference feature, in a training mode, as a function of a training input utterance, calculating an input noise value, in a recognition mode, as a function of an input utterance, calculating a reject value as a ratio of the input noise value and the noise reference feature, wherein the voice recognition system determines a best match and selects the determined best match in response to the determined best match being greater than the reject value.

* * * * *